March 30, 1954
W. G. STOLK
2,673,395
HEATED SCRAPING TOOL
Filed July 5, 1949
2 Sheets-Sheet 1
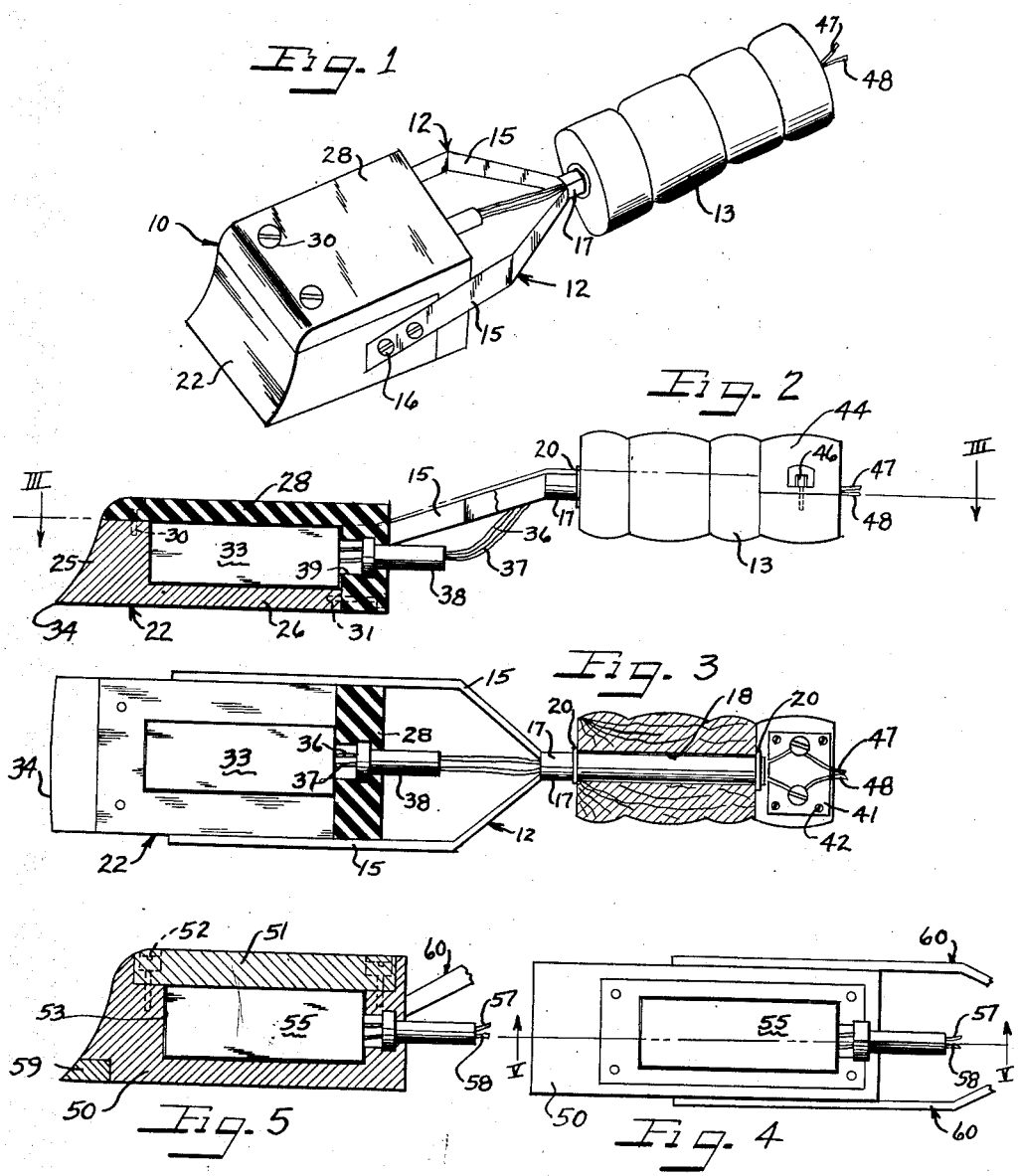
Inventor
WILLIAM G. STOLK
by Robert J. Newman
Francis W. Anderson Attys.

March 30, 1954

W. G. STOLK 2,673,395

HEATED SCRAPING TOOL

Filed July 5, 1949

Inventor
WILLIAM G. STOLK
by Robert J. Newman
Francis W. Anderson Attys.

Patented Mar. 30, 1954

2,673,395

UNITED STATES PATENT OFFICE 2,673,395

HEATED SCRAPING TOOL

William G. Stolk, Riverside, Ill., assignor of one-third to Lawrence E. Spotswood, La Grange, one-sixth to Robert J. Newman, Brookfield, and one-sixth to Francis W. Anderson, Berkeley, Ill.

Application July 5, 1949, Serial No. 103,092

1 Claim. (Cl. 30—140)

This invention relates to improvements in scraping tools. More particularly, it has to do with a scraper in which the blade is heated by an element inside the casing of the scraper in order that heat can be applied by the blade at the point at which two materials are bonded together and thus expedite separation of the materials during the scraping operation.

The under-surfaces of various metal body members of modern automobiles are coated with an asphalt base mastic for protection against corrosion and for sound deadening purposes. This coating may be as much as a half inch in thickness, depending upon the part to which it is applied. When body members, such as fenders, are creased or dented, it is necessary to first remove the coating of mastic which forms a cushioning layer and prevents accurate working of the metal. Heretofore the mastic has been removed either by applying a blow torch directly to the mastic or by directing the flame of the torch against the opposite side of the fender. In each case, the temperature of the mastic is brought up to the melting point so that the coating will tend to flow off the metal. The application of an open flame to the mastic material gives rise to a dangerous fire hazard, since many of these materials are inflammable, and gasoline vapors often are present in the atmosphere in body shops. Further, both methods are relatively inefficient, and scraping often is required to obtain a clean surface. Finally, these methods are objectionable from the viewpoint of the mechanic because of the evolution of irritating fumes and the danger of skin burns from the molten mastic.

It is therefore an important object of this invention to provide an apparatus for removing a mastic material from a backing surface without incurring the danger of fire or of burns from hot, molten mastic.

A further object of this invention is to provide a scraping tool that heats the mastic material only momentarily as the scraping edge contacts said material.

Another object of this invention is the provision of a scraping tool having a blade that is heated by contact with an electrically heated element.

A further object of this invention is the provision of a scraping tool having a removable blade secured in an insulated casing.

Although the heated scraping tool of this invention is particularly useful for removing sound proofing mastic from the under-surface of body members of an automobile, it is to be understood that the tool is not limited to such usage; it being generally useful for separating two materials which are adhesively secured together, and at least one of which is softenable upon the application of heat. For example, an obvious use of this novel tool is in the removal of inlaid linoleum from a floor.

Other and further features, objects, and usages of the scraping tool of this invention will become apparent to one skilled in the art from the following detailed description taken in connection with the accompanying drawings.

On the drawings:

Figure 1 is a perspective view of a scraping tool constructed according to the teachings of the present invention.

Figure 2 is a side elevational view, partly in vertical section, of the scraping tool of Figure 1, showing a handle bent into a substantially horizontal position.

Figure 3 is a horizontal sectional view taken on line III—III of Figure 2.

Figure 4 is a fragmentary top plan view of a modified form of the scraping tool of the present invention.

Figure 5 is a fragmentary vertical sectional view taken on line V—V of Figure 4.

As shown on the drawings:

Figure 6:
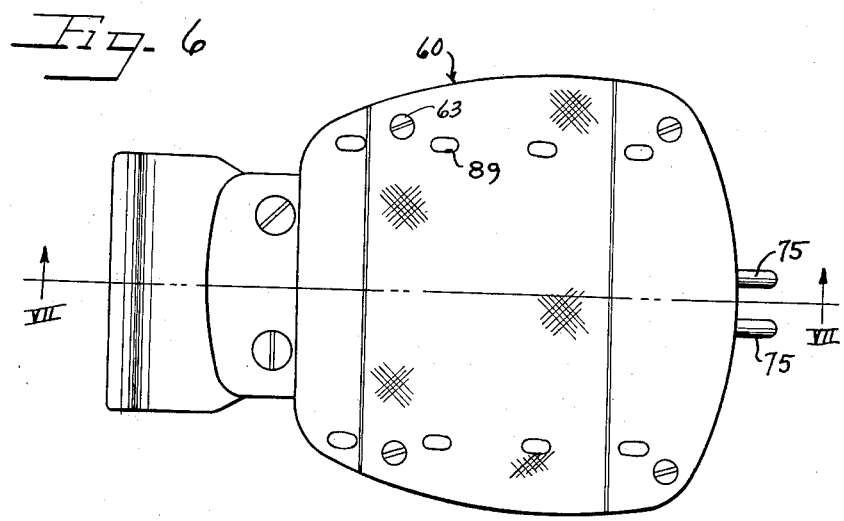
Figure 6 is a top plan view of a second modification of the scraping tool of the present invention.

In Figure 1 the reference numeral 10 represents a scraping head connected by a pair of arms 12 to a wooden handle 13. Each arm includes a bent strap portion 15 secured by setscrews 16 to the head 10 and a semi-cylindrical portion 17 (Figure 3) that extends through an elongated axial passage 18 in the handle 13. The semi-cylindrical portions 17 of the arms are in confronting, abutting relation defining a tubular passage through the handle 13. Spring clips 20 are disposed in annular grooves (not shown) in the semi-cylindrical portions 17 against the end walls of the handle to lock these members therein.

The head 10 comprises a lower base member 22 including upstanding sidewalls 23 and 24, a front wall 25 and a bottom wall 26. An angle shaped closure plate 28 fits over the entire top and rear surface of the base member 22, being secured to the front wall 25 by screws 30 and to the bottom wall by screws 31.

The front and side walls of the base member 22 define a cavity in which is positioned an electric heating element 33. This heating element may be of any commercial type adapted to heat the base member 22 by contact therewith. While the cavity in the base member 22 is illustrated as having a boxlike configuration, it is to be understood that this cavity can be of any configuration depending on the shape of the heating element that is used. In other words, the walls of the heat-cavity can assume the configuration of the heating element so that there will be a maximum amount of contact area between the element and the base and consequently a maximum amount of heat transfer to the base member 22.

The closure plate may, if desired, bear down against the heating element to hold it in place. It will be understood that this closure plate may be constructed of an insulating material so that the heat from the element 33 will be directed toward the forward edge of the base member 22.

The base member 22 may be made of steel or any other material having a capacity for conducting heat from the element-contacting surface to the scraping edge 34. As shown in Figure 3, the scraping edge 34 may be of a slightly arcuate configuration to increase the efficiency of the scraper in difficult positions.

The heating element 33 is connected to a source of electric energy by leads 36 and 37 which pass through a rubber grommet 38 positioned in an aperture 39 in the rear wall of the closure plate 28 and through the tubular passage in the handle 13 to an insulated connector plate 41 (Figure 3) which is secured by setscrews 42 to the handle 13. A portion 44 (Figure 2) of the handle 13 is removably mounted on the handle by screws 46 over the insulating connector plate 41. It will of course be understood that the cap portion 44 has a partially hollowed-out interior to accommodate the connector screws 46 and a rear aperture through which leads 47 and 48 extend.

In practice, a plug mounted on the ends of the leads 47 and 48 is connected to a source of electric energy. The heating element 33 becomes hot and, due to its contact with the base member 22, causes this member including the blade edge 34 to become hot.

When the hot edge 34 is pressed against the mastic as the scraping tool is moved along, the mastic is heated at the point where it adheres to the backing plate. This instantaneous heating causes the mastic to readily release its hold on the backing plate and peel off as the scraping blade is moved along. It is to be noted that since only the edge of the mastic is heated, the main portion of the mastic will be cool as it is peeled off. Thus, the operator will not be burned by contact with this material.

In Figures 4 and 5 a modified scraping tool is illustrated including a base member 50 and a cover 51 secured to the base by countersunk setscrews 52. The base member 50 includes the bottom, front, rear and side walls of the casing defining a cavity 53 in which a heating element 55 is disposed.

It will be understood that the heating element 55 is identical to the element 33 previously described and is energized through leads 57 and 58 in an identical manner. The scraping tool of Figures 4 and 5 has arm members 60 identical to the arms 12 of Figure 3.

This modification features a casing including a base member 50 and a cover 51 that may be made of the same heat conducting material. The base 50 may advantageously be a one-piece casting having a central cavity. This modification also features a blade insert 59 which may be suitably secured in the base 50. This insert may be made of a special wear-resisting material that will stand up well under the scraping action.

Figure 7:
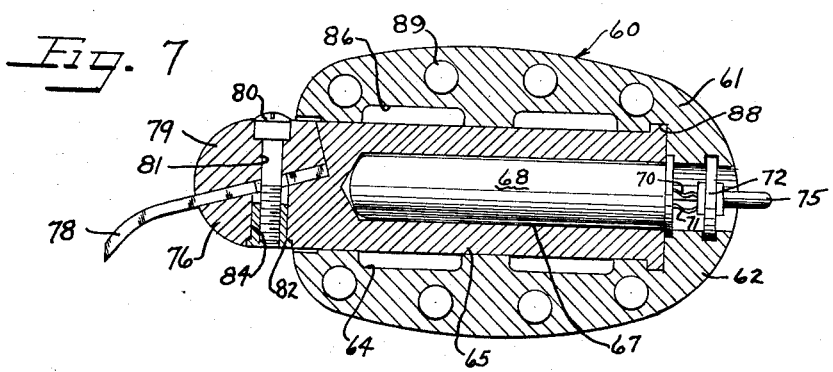
Figure 7 is a vertical sectional view taken on line VII—VII of Figure 6.

A third embodiment of the scraping tool of the present invention is illustrated in Figures 6 and 7. This modification features a casing 60 including an upper half portion 61 and a lower half 62 secured together by any suitable means, as by capscrews 63. Each half is hollowed out so that when assembled together they define a cavity 64 in which is positioned a core 65. This core 65 is constructed of a heat conducting material and has a central cavity 67 which receives a heating element 68 in close fitting contact.

The element 68 is energized through leads 70 and 71 which are connected into a male electrical connector 72. This connector 72 is retained in a groove 73 in the casing 60 having two prong members 75 projecting through an opening at the rear of the casing for receiving the female portion of the connection.

A ledge 76 extends from the forward portion of the core 65 exteriorly of the casing 60. A scraping blade 78 of wear resistant metal is secured on this ledge by a removable core portion 79 and a bolt 80 which passes freely through an aperture 81 in the core portion 79 and is threaded into a nut 82 in an opening 84 in the ledge 76.

Thus there is provided in this embodiment a removable blade that is heated through the heating element 68 and the core 65. The casing 60 is of a convenient size for manual manipulation.

In order to prevent the casing from becoming hot, several annular recesses 86 are provided in the interior of the casing around the element 68. As a result the element contacts the casing only at a few guide shoulders and in a retaining groove 88. The casing 60 may be made of any insulating material such as a heat resistant plastic. Air ventilation passages 89 are also provided in the casing 60.

From the foregoing description it will be seen that there is provided in this invention a simple, efficient scraping tool by which heat may be applied to two adhesively secured materials at the point of bonding simultaneously with the application of the scraping blade.

The use of this tool is advantageous for a number of reasons. Since open flames are not employed and the mastic is not heated to combustion temperatures, fire hazards are eliminated and noxious fumes are avoided. The scrapings are cool as they leave the tool, hence the possibility of skin burns is greatly reduced. Finally, greater efficiency is attained since only a portion of the mastic need be heated, namely, the mastic that is immediately adjacent the metal surface.

It will be understood that modifications and variations may be effected without departing from the scope of the novel concepts of the present invention. For example, a particularly useful modification of the device shown in Figures 4 and 5 comprises the use of a heating element 55 that is smaller than cavity 53. The heating element is positioned against the bottom wall of the cavity and the remaining space is filled with insulation. This arrangement reduces radiation losses and tends to drive more of the heat into the blade.

I claim as my invention:

A scraping tool comprising an insulated housing having an elongated chamber extending therethrough and an annular groove in the inner wall of said chamber, a core member of heat conducting material in said housing having a flange portion retainingly engaged in said groove in said housing, a heating element in said housing having a flange locked between said core and said housing and an elongated portion in contact with said core, and a blade removably secured on said core and projecting exteriorly of said housing.

WILLIAM G. STOLK.

References Cited in the file of this patent

UNITED STATES PATENTS

| Number | Name | Date |
|---|---|---|
| 1,192,389 | Chandler | July 25, 1916 |
| 1,228,180 | Chandler | May 29, 1917 |
| 1,809,718 | McNeil | June 9, 1931 |
| 1,821,574 | Peters | Sept. 1, 1931 |
| 2,033,327 | Coffelt | Mar. 10, 1936 |
| 2,062,998 | Peterson | Dec. 1, 1936 |
| 2,263,222 | Morris | Nov. 18, 1941 |
| 2,304,559 | Engesser | Dec. 8, 1942 |

FOREIGN PATENTS

| Number | Country | Date |
|---|---|---|
| 840,502 | France | Jan. 16, 1939 |